United States Patent
Karasawa et al.

(10) Patent No.: US 9,120,191 B2
(45) Date of Patent: *Sep. 1, 2015

(54) MANUFACTURING APPARATUS FOR FLATTENED TUBE FINS

(71) Applicant: Hidaka Seiki Kabushiki Kaisha, Tokyo (JP)

(72) Inventors: Masanao Karasawa, Tokyo (JP); Toshiyuki Nanaarashi, Tokyo (JP)

(73) Assignee: HIDAKA SEIKI KABUSHIKI KAISHA, Tokyo (JP)

( * ) Notice: Subject to any disclaimer, the term of this patent is extended or adjusted under 35 U.S.C. 154(b) by 190 days.

This patent is subject to a terminal disclaimer.

(21) Appl. No.: 13/783,637

(22) Filed: Mar. 4, 2013

(65) Prior Publication Data

US 2014/0053384 A1     Feb. 27, 2014

(30) Foreign Application Priority Data

Aug. 21, 2012    (JP) ................. 2012-182027

(51) Int. Cl.
*B23P 15/26* (2006.01)
*B21D 53/02* (2006.01)

(52) U.S. Cl.
CPC .............. *B23P 15/26* (2013.01); *B21D 53/022* (2013.01); *Y10T 29/5185* (2015.01); *Y10T 29/5197* (2015.01); *Y10T 29/5198* (2015.01)

(58) Field of Classification Search
CPC ...... B65H 20/30; B65H 20/32; B21D 53/022; B21D 53/025; B23P 15/26; Y10T 29/5197; Y10T 29/5198

USPC ........ 29/33 Q, 33 S; 226/118.1, 118.2, 118.4; 72/325, 330, 331, 333, 334, 335, 336
See application file for complete search history.

(56) References Cited

U.S. PATENT DOCUMENTS

| | | | | |
|---|---|---|---|---|
| 3,940,042 A | * | 2/1976 | Keck | 226/44 |
| 4,407,064 A | * | 10/1983 | Denner et al. | 29/726 |
| 5,349,841 A | * | 9/1994 | Honma et al. | 72/333 |
| 5,617,985 A | * | 4/1997 | Baer | 226/4 |

(Continued)

FOREIGN PATENT DOCUMENTS

| | | |
|---|---|---|
| JP | 55-035781 A | 3/1980 |
| JP | 05-192728 A | 8/1993 |

(Continued)

*Primary Examiner* — Sunil K Singh
*Assistant Examiner* — Michael Vitale
(74) *Attorney, Agent, or Firm* — Birch, Stewart, Kolasch & Birch, LLP

(57) ABSTRACT

A flattened tube fin manufacturing apparatus includes a press apparatus equipped with a mold apparatus forming cutaway portions into which flattened tubes are inserted to produce metal strips; an inter-row slit apparatus cutting the metal strip, in which the cutaway portions have been formed, into predetermined widths to form a plurality of metal strips of a product width arranged in the width direction; and a cutoff apparatus cutting each metal strip of the product width formed by the inter-row slit apparatus into predetermined lengths. The metal strips of the product width outputted from the inter-row slit apparatus advance into the cutoff apparatus after entering a downwardly sagging state. A support portion that contacts and supports lower surfaces of the metal strips of product width in the downwardly sagging state is also provided.

4 Claims, 6 Drawing Sheets

(56) References Cited

U.S. PATENT DOCUMENTS 7,137,283 B2 * 11/2006 Narushima et al. ............. 72/206
2014/0115881 A1 * 5/2014 Baba et al. ...................... 29/727

FOREIGN PATENT DOCUMENTS

| JP | 6-211394 A | 8/1994 |
| WO | WO 2012/098916 A1 | 7/2012 |

* cited by examiner

MANUFACTURING APPARATUS FOR FLATTENED TUBE FINS

CROSS-REFERENCE TO RELATED APPLICATION(S)

This application is based upon and claims the benefit of priority of the prior Japanese Patent Application No. 2012-182027, filed on Aug. 21, 2012, the entire contents of which are incorporated herein by reference.

FIELD

The present invention relates to a manufacturing apparatus for flattened tube fins that manufactures fins for a heat exchanger that uses flattened tubes.

BACKGROUND

An existing heat exchanger, such as an air conditioner, is typically constructed by stacking a plurality of heat exchanger fins, in which a plurality of through-holes have been formed to enable heat exchanger tubes to be inserted. Such heat exchanger fins are manufactured by a manufacturing apparatus for heat exchanger fins depicted in FIG. 5. The manufacturing apparatus for heat exchanger fins is equipped with an uncoiler 12 where a thin metal plate 10 made of aluminum or the like has been wound into a coil. The metal strip 10 pulled out from the uncoiler 12 via pinch rollers 14 is inserted into an oil applying apparatus 16 where machining oil is applied onto the surface of the metal strip 10, and is then supplied to a mold apparatus 20 provided inside a press apparatus 18.

The mold apparatus 20 internally includes an upper mold die set 22 that is capable of up-down movement and a lower mold die set 24 that is static. A plurality of collar-equipped through-holes (not illustrated), where collars of a predetermined height are formed around through-holes, are formed at predetermined intervals in a predetermined direction by the mold apparatus 20. The result of machining the metal thin plate to produce the through-holes and the like is hereinafter referred to as the "metal strip 11".

The metal strip 11 that is machined here is formed with a plurality of heat exchanger fins as the final products aligned in the width direction. For this reason, an inter-row slit apparatus is provided in the mold apparatus 20. In the inter-row slit apparatus, an intermittently fed metal strip 49 is cut by upper blades and lower blades coming together so as to manufacture products (referred to below as "metal strips of the product width") in the form of long strips in the conveying direction.

The metal strips of the product width are cut into predetermined lengths by a cutter 26. The products that have been cut into the predetermined lengths (i.e., the heat exchanger fins) are then stacked in a stacker 28. The stacker has a plurality of pins 27 that are erected in the perpendicular direction and stacks the manufactured heat exchanger fins with the pins 27 inserted into the through holes.

Patent Document 1

Japanese Laid-Open Patent Publication No. H06-211394

SUMMARY

On an existing heat exchanger fin, a plurality of through-holes into which heat exchanger tubes are inserted are formed in a metal strip. However, at present, heat exchangers that use multi-channel flattened tubes are being developed. A heat exchanger fin that uses such flattened tubes is depicted in FIGS. 6A and 6B (and will be referred to hereinafter as a "flattened tube fin").

On a flattened tube fin 30, cutaway portions 34 into which the flattened tubes 32 are inserted are formed at a plurality of positions, and plate-like portions 36, where louvers 35 are formed, are formed between cutaway portion 34 and cutaway portion 34. The cutaway portions 34 are formed from only one side in the width direction of a fin 31. Accordingly, the plate-like portions 36 between cutaway portion 34 and cutaway portion 34 are joined by a joining portion 38 that extends along the length direction.

However, in a manufacturing apparatus that manufactures flattened tube fins, at the cutoff apparatus that forms the heat exchanger fins as the final products by cutting the metal strips of product width into predetermined lengths, to enable the lengths of the products to be arbitrarily changed, the feeding length per single cutoff operation can be set longer than the feeding length of the metal strips of product length per operation (that is, per closing of the mold) of the press apparatus. Here, since a length that is longer than the length of one feeding operation by the cutoff apparatus is temporarily held between the press apparatus and the cutoff apparatus, allowing the metal strips of product width to sag downward is being investigated.

However, since the metal strips of product width are formed extremely thinly, there is the risk of the strips deforming under their own weight at locations where the strips sag downwards.

The present invention was conceived to solve the problem described above and has an object of providing a manufacturing apparatus for flattened tube fins that is capable, when manufacturing flattened tube fins, of preventing deformation of the metal strips of product width.

A flattened tube fin manufacturing apparatus according to an aspect of the present invention that manufactures flattened tube fins in which cutaway portions, into which flattened tubes for heat exchanging are inserted, are formed from one side toward another side in a width direction, the manufacturing apparatus including: a press apparatus equipped with a mold apparatus that forms the cutaway portions in an unmachined thin plate of metal to produce a metal strip; an inter-row slit apparatus which cuts the metal strip, in which the cutaway portions have been formed, into predetermined widths to form a plurality of metal strips of a product width that are arranged in the width direction; and a cutoff apparatus that cuts each of the plurality of metal strips of the product width formed by the inter-row slit apparatus into predetermined lengths, wherein the plurality of metal strips of the product width outputted from the inter-row slit apparatus are provided so as to advance into the cutoff apparatus after entering a downwardly sagging state, and the flattened tube fin manufacturing apparatus further comprises support portion that contacts lower surfaces of plurality of metal strips of product width in the downwardly sagging state to support the plurality of metal strips of product width.

With the above construction, it is possible to support lower surfaces of metal strips of product width in a sagging state and thereby prevent deformation of the metal strips of product width.

The support portion may be capable of up-down movement in accordance with up-down movement of the plurality of metal strips of product width in the downwardly sagging state.

With the above construction, although the position of the lower surfaces of the plurality of metal strips of product width will move up and down due for example to the sagging of the plurality of metal strips of product width increasing and decreasing due to the relationship between the speed at which the metal strips of product width are fed out from the inter-row slit apparatus and the speed at which the metal strips of product width are drawn into the cutoff apparatus, since it is possible to support the lower surfaces of the metal strips of product width in keeping with such up-down movement, it is possible to prevent deformation of the metal strips of product width.

Also, the support portion may be raised in synchronization with a drawing-in speed of the plurality of metal strips of product width by the cutoff apparatus, and the support portion may be lowered in synchronization with a feeding speed of the plurality of metal strips of product width from the inter-row slit apparatus when drawing in by the cutoff apparatus is stopped.

With the above construction, by supporting the lower surfaces of the metal strips of product width in keeping with the up-down movement of the positions of the lower surfaces of the metal strips of product width based on the conveying speed of the plurality of metal strips of product width, it is possible to prevent deformation of the metal strips of product width.

The support portion may be provided so that contact with the lower surfaces of the plurality of metal strips of product width is constantly maintained during raising by raising the support portion at a same time or earlier than timing at which the lower surfaces of the plurality of metal strips of product width in the downwardly sagging state are raised and during lowering by lowering the support portion at the same time or later than timing at which the lower surfaces of the plurality of metal strips of product width in the downwardly sagging state are lowered.

With the above construction, since the support portion moves up and down so as to constantly contact the lower surfaces of the metal strips of product width, it is possible to reliably prevent deformation of the metal strips of product width.

In addition, the support portion may include a plurality of contact surfaces that contact respective lower surfaces of the plurality of metal strips of the product width, the respective contact surfaces may be formed so as to be inclined so that side surfaces of the metal strips of the product width where the cutaway portions are formed are positioned higher and side surfaces of the metal strips of the product width where the cutaway portions are not formed are positioned lower, and side walls that contact the side surfaces of the metal strips of the product width where the cutaway portions are not formed may be formed on the contact surfaces.

That is, since the side surfaces where the cutaway portions are formed are mechanically weak, it is not desirable for such surfaces to contact any kind of member. For this reason, the side surfaces where the cutaway portions are formed are placed on a higher part of the inclined surfaces so as to not be contacted by anything and the sides where the cutaway portions are not formed move down the inclines of the contact surfaces due to gravity and are supported by the side walls. This means that it is possible to reliably support the metal strips of product width with the support portion and to prevent deformation of the sides in which the cutaway portions are formed.

According to the present invention, it is possible to prevent deformation of metal strips of product width when manufacturing flattened tube fins.

DESCRIPTION OF EMBODIMENT(S)

Figure 1:
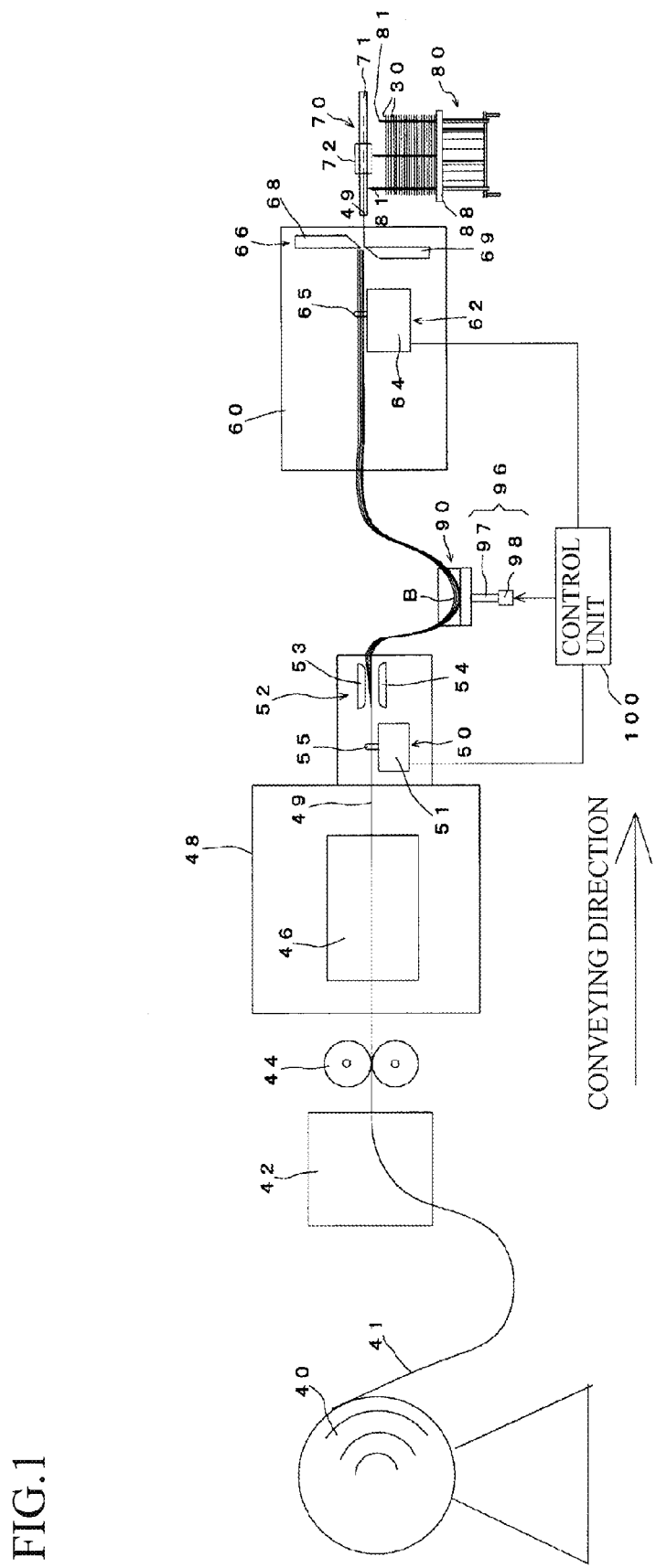
FIG. 1 is a side view depicting the overall configuration of a manufacturing apparatus for flattened tube fins.

The overall configuration of a manufacturing apparatus for flattened tube fins according to the present invention is depicted in FIG. 1. A thin metal plate 41 that is made of aluminum or the like and is yet to be machined is wound in a coil in an uncoiler 40. The thin plate 41 pulled out from the uncoiler 40 is inserted into a loop controller 42, and fluctuations in the thin plate 41 that is intermittently fed out are suppressed by the loop controller 42.

An NC feeder 44 is provided downstream of the loop controller 42. The NC feeder 44 is composed of two rollers that touch the upper surface and the lower surface of the thin plate 41. By rotationally driving the two rollers of the NC feeder 44, the thin plate 41 is sandwiched and intermittently fed. A press apparatus 48 that has a mold apparatus 46 disposed inside is provided downstream of the NC feeder 44. Using the press apparatus 48, the thin plate 41 is formed into a metal strip 49 of a predetermined shape by the mold apparatus 46.

Figure 2:
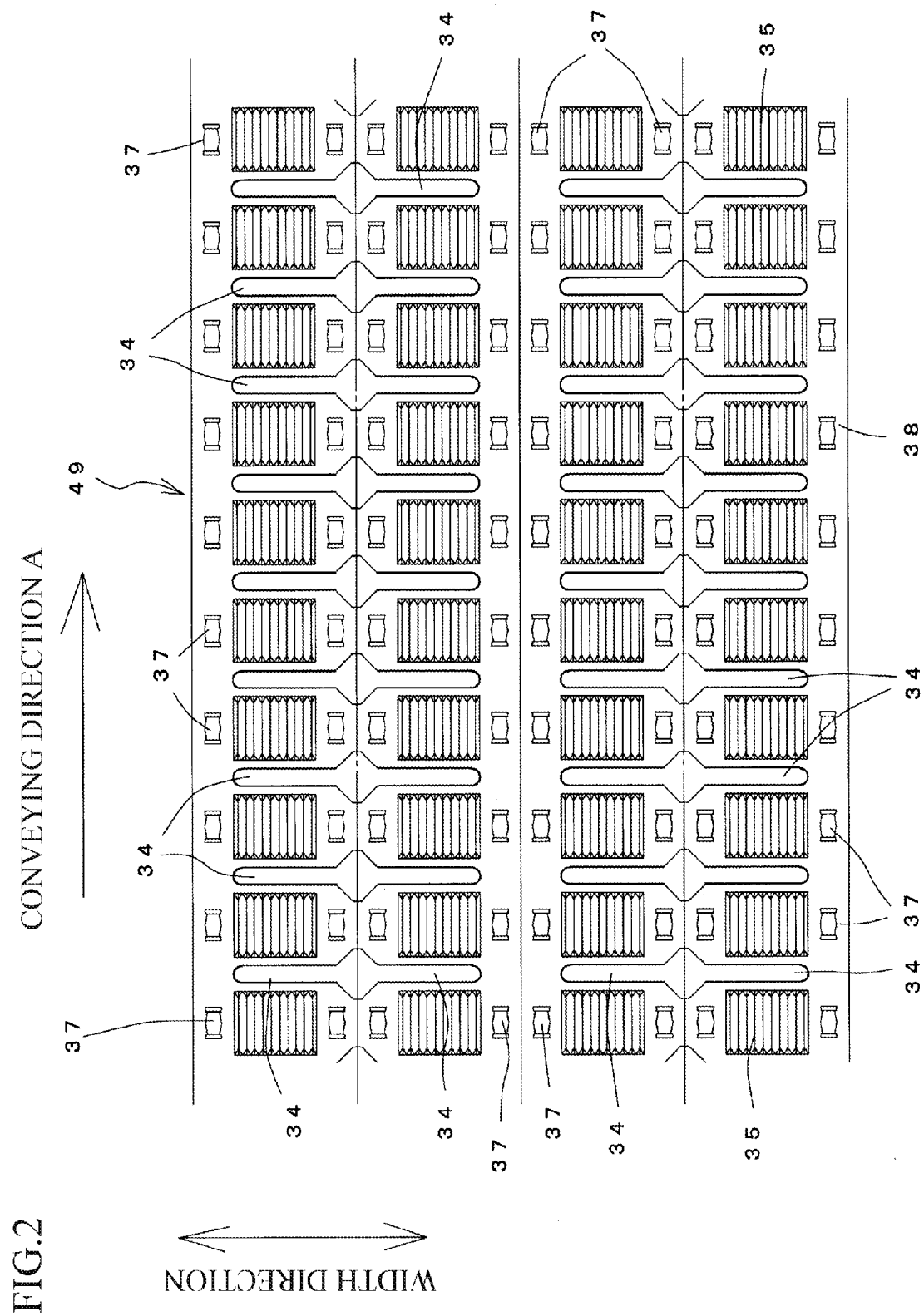
FIG. 2 is a plan view of a metal strip machined by the mold apparatus appearing in FIG. 1.
Figures 6A, 6B:
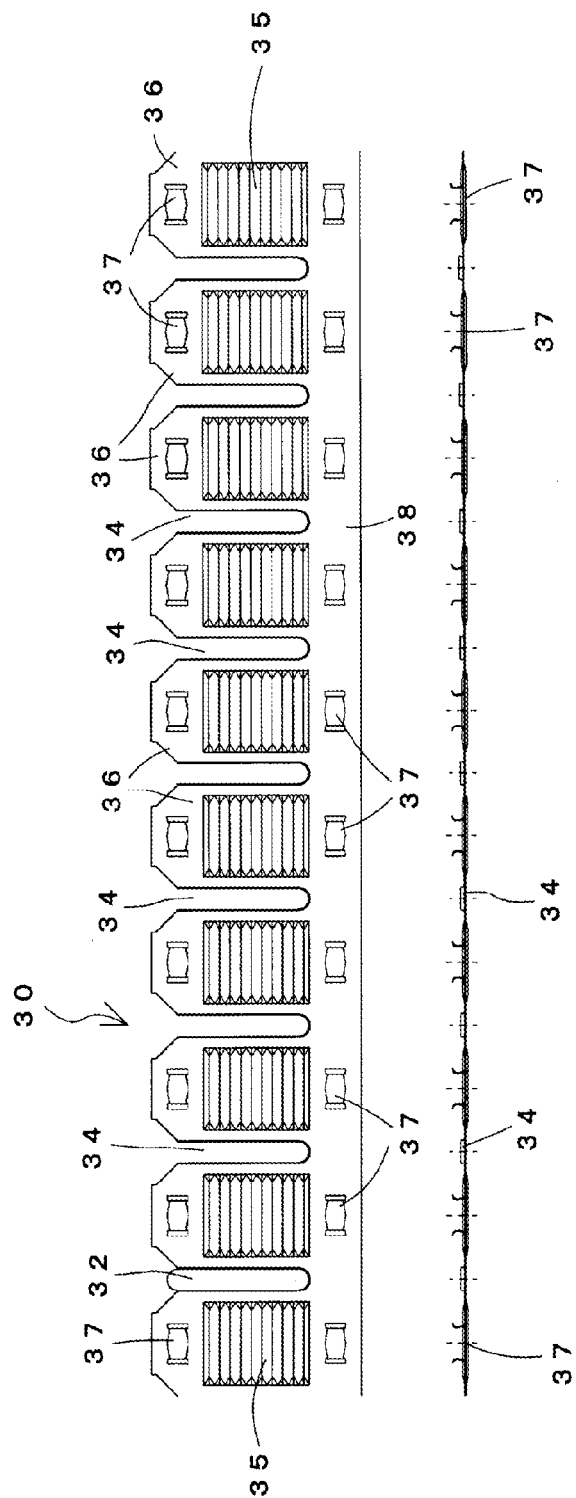
FIG. 6A is a plan view of a flattened tube fin and FIG. 6B is a side view of the flattened tube fin.

The metal strip 49 formed here is depicted in FIG. 2. The metal strip 49 depicted in FIG. 2 has four products formed in a line in the width direction that is perpendicular to the conveying direction A. As depicted in FIG. 6, the specific products on the metal strip 49 each have the cutaway portions 34, into which the flattened tubes 32 will be inserted, formed at a plurality of positions and the plate-like portions 36, where louvers 35 are formed, formed between cutaway portion 34 and cutaway portion 34. Openings 37 formed by cutting and folding up the thin metal plate are formed at both end portions in the width direction of the louvers 35. Out of the two openings 37, 37 formed for one louver 35, one opening 37 is formed at a front end side of a plate-like portion 36.

The cutaway portions 34 are formed from only one side in the width direction of each fin 30. Accordingly, the plurality of plate-like portions 36 between cutaway portion 34 and cutaway portion 34 are continuously joined by a joining portion 38 that extends in the length direction. Out of the two openings 37, 37 for one louver 35 described above, the opening 37 on the other side is formed on the joining portion 38.

On the metal strip 49 in FIG. 2, two products disposed with the open ends of the cutaway portions 34 adjacent to one another form a pair, and two of such pairs are formed. That is, the pairs, in which the open ends of the cutaway portions 34 of two products are disposed facing one another, are placed so that the joining portions 38 thereof are adjacent. In this way, by disposing four products in an alternating arrangement, the left-right load balance of the mold is improved.

Note that unlike a metal strip such as that depicted in FIG. 2, if the open ends of the cutaway portions 34 of a plurality of products were disposed so as to all face in a single direction, when cutting is carried out between the products by an inter-row slit apparatus 52 (described later) that cuts out the products, there would be a high probability that cutting fragments (or "whiskers" or "cutting defects") would be produced between the cutaway portions 34 and the other positions due to displacements in the cutting positions. Accordingly, when the open ends of the cutaway portions 34 of a plurality of products are all disposed so as to face in a single direction, it becomes necessary to cut not at the boundary of the openings of the cutaway portions 34 but to slightly extend the open parts of the cutaway portions 34 as far as a position advanced into a joining portion 38 and to cut at such position. However, in such case, the cross-section becomes stepped and there is deterioration in the left-right load balance of the mold. Accordingly, it is preferable to manufacture a plurality of products with the arrangement depicted in FIG. 2.

The description will now return to the overall construction of the manufacturing apparatus. The metal strip 49 formed by the mold apparatus 46 in the press apparatus 48 is fed intermittently in the conveying direction by a feeding apparatus 50 provided downstream of the press apparatus 48. The feed timing of the feeding apparatus 50 is provided so that the feeding apparatus 50 operates in concert with the NC feeder 44 to enable stable intermittent feeding.

In the feeding apparatus 50, a reciprocating unit 51 that is capable of moving in the horizontal direction moves reciprocally between an initial position and a conveyed position to pull the metal strip 49. Feed pins 55 that protrude upward are disposed on the upper surface of the reciprocating unit 51, the feed pins 55 advance from below into the cutaway portions 34 formed in the metal strip 49, and the metal strip 49 is moved to the conveyed position by pulling with the feed pins 55.

The inter-row slit apparatus 52 is provided downstream of the feeding apparatus 50. The inter-row slit apparatus 52 includes upper blades 53 disposed on the upper surface side of the metal strip 49 and lower blades 54 disposed on the lower surface side of the metal strip 49. The inter-row slit apparatus 52 may be provided so as to operate using an up-down movement operation of the press apparatus 48. The upper blades 53 and the lower blades 54 are formed so as to be elongated in the conveying direction of the metal strip 49 and the intermittently fed metal strip 49 is cut by the upper blades and the lower blades 54 coming together so as to manufacture products (referred to below as "metal strips of the product width") in the form of long strips in the conveying direction.

The plurality of metal strips 49 of the product width that have been cut to the product width by the inter-row slit apparatus 52 are fed into a cutoff apparatus 60. Note that before feeding into the cutoff apparatus 60, the plurality of metal strips 49 of the product width are disposed with predetermined intervals between neighboring metal strips 49 of the product width (such intervals depend on the construction of the stacker apparatus described later, but are around 5 to 10 mm). Also, before feeding into the cutoff apparatus 60, sections of the plurality of metal strips 49 of the product width that are longer than the length of one feeding operation by the cutoff apparatus 60 are temporarily held and allowed to sag downward (see symbol B in FIG. 1).

A feeding apparatus 62 that intermittently conveys the respective metal strips 49 of the product width in the conveying direction is provided inside the cutoff apparatus 60. As the construction of the feeding apparatus 62, a construction where it is possible to set the length of one feeding operation longer than with the construction of the feeding apparatus 50 provided at the downstream side of the press apparatus 48 is used. In the feeding apparatus 62, a conveying unit 64 that is capable of moving in the horizontal direction moves by a predetermined distance to pull the metal strips 49 of the product width from the press apparatus 48 side and push the metal strips 49 of the product width to the downstream side of the cutoff apparatus 60. On the upper surface of the conveying unit 64, a plurality of feeding pins 65 are disposed so as to protrude upward and are aligned in the horizontal direction in an equal number of rows to the number of metal strips 49 of the product width. The feeding pins 65 are inserted from below into the cutaway portions 34 formed in the respective metal strips 49 of the product width, and due to being pulled by the feeding pins 65, the metal strips 49 of the product width move as far as a conveyed position.

A cutting apparatus 66 is provided downstream of the feeding apparatus 62. The cutting apparatus 66 cuts the respective metal strips 49 of the product width into predetermined lengths to produce the final flattened tube fins 30. The cutting apparatus 66 includes an upper blade 68 disposed on the upper surface side of the metal strips 49 of the product width and a lower blade 69 disposed on the lower surface of the metal strips 49 of the product width. By closing the upper blade 68 and the lower blade 69, the metal strips 49 of the product width are cut into predetermined lengths along the conveying direction to manufacture the flattened tube fins 30.

A plurality of the manufactured flattened tube fins 30 are stacked in a stacker apparatus 80. One example of the stacking of the flattened tube fins will now be described. The flattened tube fins 30 that have been cut to a predetermined dimension by the cutoff apparatus 60 are held by a holder apparatus 70 that maintains a holding state. The stacker apparatus 80 for stacking the flattened tube fins 30 that have been cut into predetermined lengths by the cutoff apparatus 60 is provided below the holder apparatus 70.

The holder apparatus 70 includes a pair of holding members 71 provided so as to be capable of moving toward and away from each other between a side position to the side of the metal strips 49 of the product width fed out from the inter-row slit apparatus 52 and a holding position for the metal strips of product width. The stacker apparatus 80 includes a plurality of stacker pins 81 capable of moving in the up-down direction so as to be inserted through the cutaway portions 34 of the flattened tube fins 30 held by the holder apparatus 70 and a fin receiving portion 88 that contacts lower surfaces of the bottom flattened tube fins out of the plurality of flattened tube fins 30 through which the stacker pins 81 have been inserted and is capable of moving in the up-down direction separately to the up-down movement of the stacker pins 81.

The construction of the stacker apparatus is not limited to this example and it is also possible to use a magazine-type construction, for example.

Figure 3:
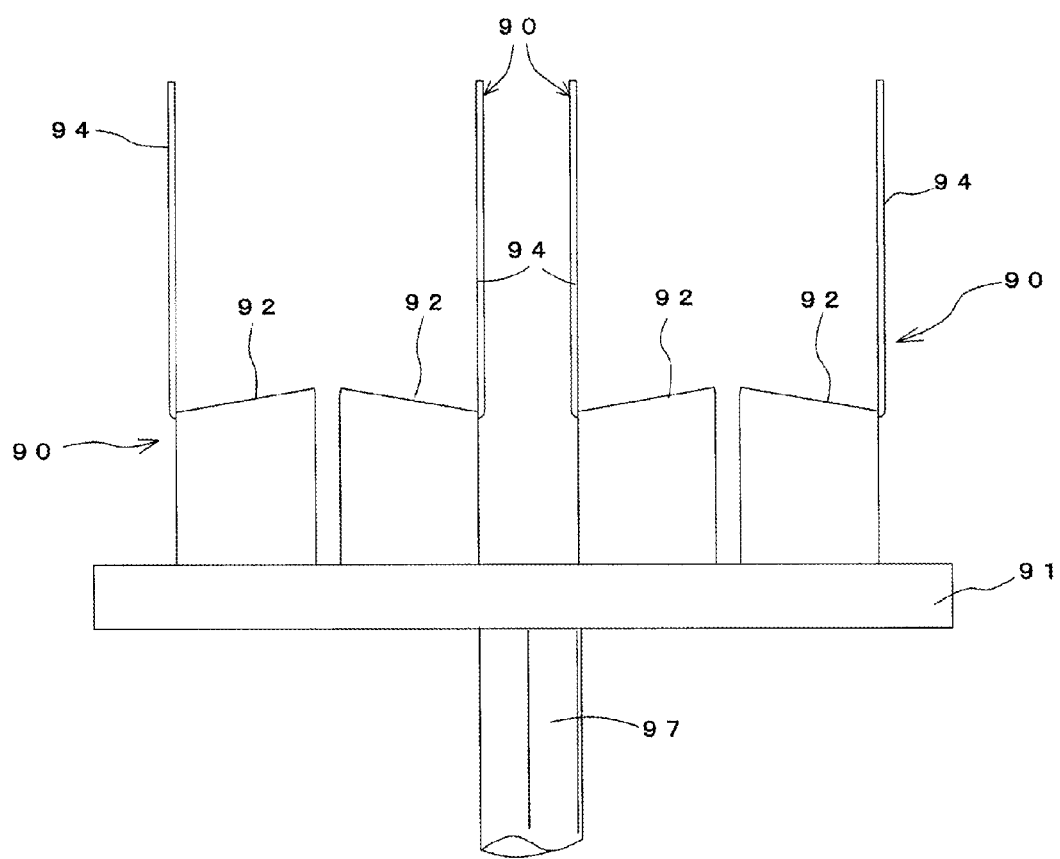
FIG. 3 is a front view of support portions provided between a press apparatus and a cutoff apparatus.

As described earlier, the plurality of metal strips 49 of the product width are allowed to sag downward between the press apparatus 48 and the cutoff apparatus 60. Such sagging parts will sometimes be referred to as the "loops B". A plurality of support portions 90 that support the respective loops B are provided at the lower ends of the loops B. FIG. 3 is a front view of the support portions 90. A support portion 90 is provided for each metal strip 49 of the product width so as to be capable of supporting such metal strip 49 of the product width. Such support portions 90 are disposed on a single base 91 and are capable of moving up and down at the same time as up-down movement of the base 91.

The construction of the respective support portions 90 is described below. The support portions 90 are formed with contact surfaces 92 that contact the lower surfaces of the loops B of the metal strips 49 of the product width. The contact surfaces 92 are formed so as to be inclined in a direction (width direction) that is perpendicular to the conveying direction. Side walls 94 that are upwardly erected are provided at the lower side ends of the inclined contact surfaces 92. Edges in the width direction of the metal strips 49 of the product width are contacted and guided by the side walls 94. Note that since the sides of the metal strips 49 of the product width where the cutaway portions 34 are formed are mechanically weak, the side walls 94 are provided so as to not contact the sides where the cutaway portions 34 are formed. That is, the inclination of the contact surface 92 of each support portion 90 is orientated so that the side of a metal strip 49 of the product width where the cutaway portions 34 are not formed (i.e., the side where the joining portion 38 is formed) becomes positioned lower than the other side.

In the example given in the present embodiment, as depicted in FIG. 2, two metal strips 49 of the product width are disposed with the open ends of the cutaway portions 34 adjacent to one another to form a pair, with two of such pairs being formed. For this reason, the four support portions 90 depicted in FIG. 3 are provided in the width direction that is perpendicular to the conveying direction, with the support portions 90 being disposed in two pairs in which the contact surfaces 92 of two support portions 90 are inclined downwardly away from each other in the manner of a roof.

The support portions 90 have an up-down movement device 96 that moves the contact surfaces 92 up and down. A ball screw, a fluid cylinder, and the like can be given as examples of the up-down movement device 96. In the present embodiment, a ball screw 97 is used as the up-down movement device 96. The ball screw 97 is attached to a center of the base 91 and extends downward from the base 91. A servo motor 98 is provided to rotate the ball screw 97. The rotational shaft of the servo motor 98 may directly rotate the ball screw 97, or if the servo motor 98 is disposed at a different position to the axis of the ball screw 97, the ball screw 97 may be rotated by a belt or the like suspended on the rotational shaft of the servo motor 98. In this way, it is possible to precisely control the up-down movement of the support portions 90 via rotational control of the servo motor 98.

Figure 4:
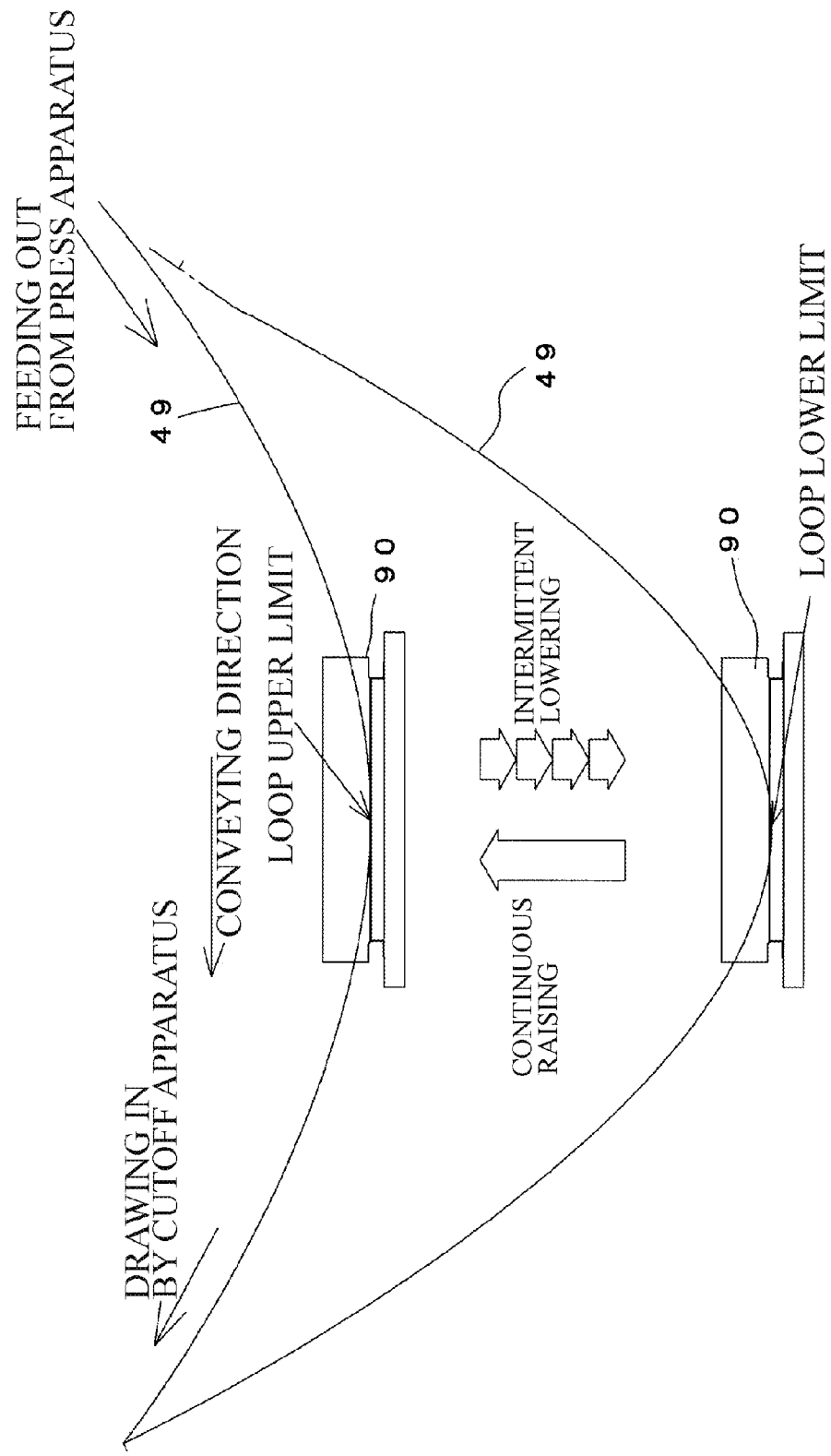
FIG. 4 is a diagram useful in explaining up-down movement of loops where metal strips of product width are allowed to sag.
Figure 5:
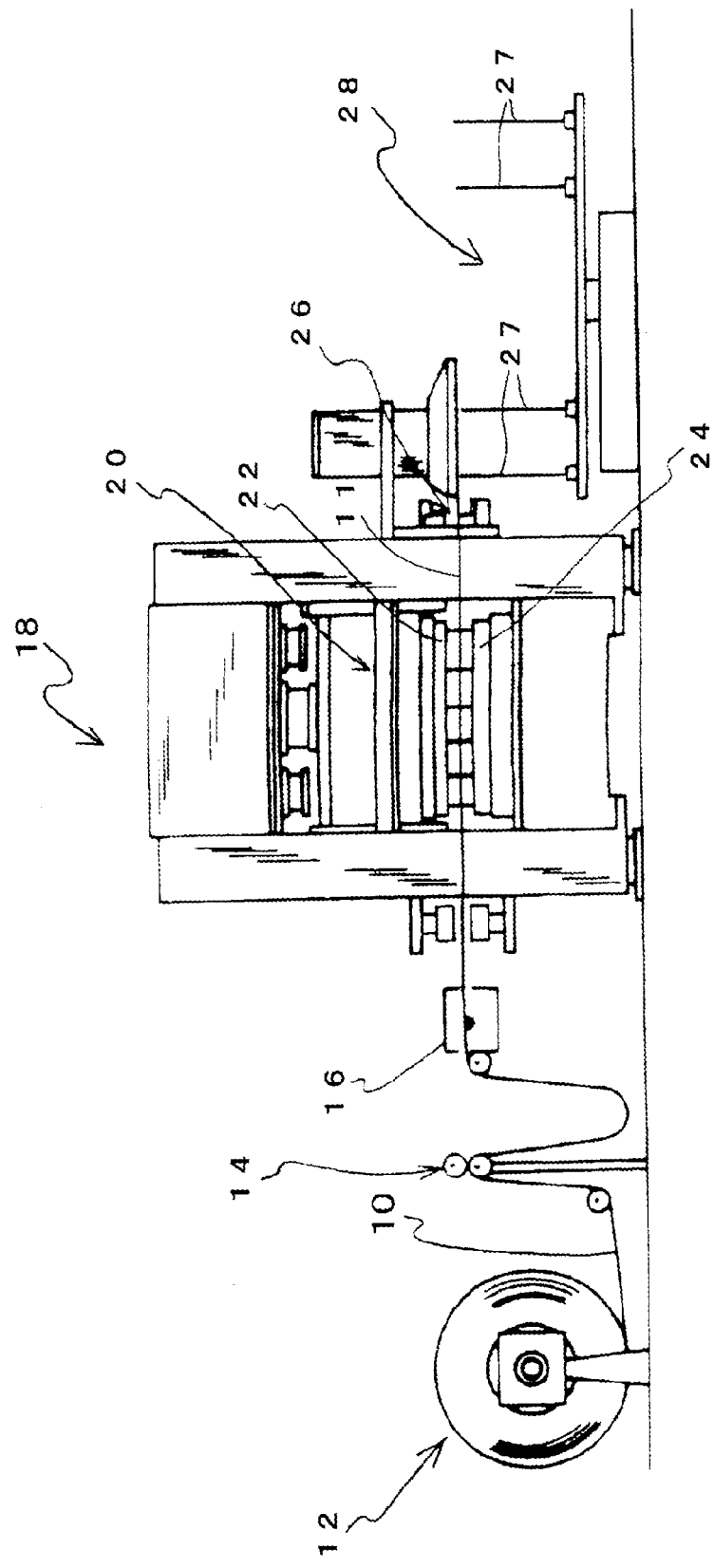
FIG. 5 is a diagram useful in explaining the overall construction of a manufacturing apparatus that manufactures heat exchanger fins.

Next, up-down movement of the support portions will be described with reference to FIG. 4. The support portions 90 are capable of moving up and down so as to continuously support the lower surfaces of the loops B of the metal strips 49 of the product width. Such up-down movement is achieved by the up-down movement device 96 that includes the ball screw and the servo motor 98 as described above. First, movement of the loops B will be described. The loops B move up and down between an upper limit position and a lower limit position in FIG. 4. The cutoff apparatus 60 draws in the metal strips 49 of the product width using the feeding apparatus 62 inside the cutoff apparatus 60, and in the present embodiment around 1000 mm is drawn in once in a 3.4-second operation cycle of the cutoff apparatus 60. By being drawn inside the cutoff apparatus 60, the loops B that were at the lower limit position at first are raised in one movement to the upper limit position.

On the other hand, the press apparatus 48 feeds out around 50 mm in one operation in 0.17 seconds. Accordingly, although the feeding out from the press apparatus 48 is intermittent, around 1000 mm is fed out in 3.4 seconds. In this way, although the loops B that are already sagging are pulled in as described above by around 1000 mm in a single operation in a 3.4 second period, around 1000 mm will also be intermittently fed out in 3.4 seconds, resulting in an up-down movement being repeated.

In this way, 1000 mm is drawn in a single operation by the cutoff apparatus 60, so that the loops B are raised from the lower limit position to the upper limit position and in the 3.4 seconds until the next pulling-in operation by the cutoff apparatus 60, the loops B are gradually lowered due to the intermittent feeding from the press apparatus and reach the lower limit position.

In this way, an operation where the loops B according to the present embodiment are raised at once and then gradually lowered is repeated. The up-down movement device 96 of the support portions 90 moves up and down in keeping with the up-down movement of the loops B so that the support portions 90 are capable of constantly supporting the loops B. The operation control of the up-down movement device 96 is carried out by a control unit 100 constructed of a CPU or the like.

As one example, a control signal of the feeding apparatus 50 of the press apparatus 48 and a control signal of the feeding apparatus 62 of the cutoff apparatus 60 are inputted into the control unit 100 that controls the up-down movement device 96 of the support portions 90 and control operations of the control unit 100 are executed in synchronization with operations of the respective feeding apparatuses 50 and 62. The control unit 100 controls the rotational speed of the servo motor 98 so as to raise the support portions 90 at the same speed as the raising speed of the loops B at the same timing as the start of operation by the feeding apparatus 62 of the cutoff apparatus 60 or at timing that is earlier than such start of operation. By doing so, it is possible to prevent a situation where the loops B are raised earlier than the lifting of the support portions 90 and the lower surfaces of the loops B become separated from the contact surfaces 92 of the support portions 90.

Also, although a drawing operation of the cutoff apparatus 60 will recommence 3.4 seconds after the loops B have reached the upper limit position, during such period the metal strips 49 of the product width are fed out intermittently (by around 50 mm at a time once in 0.17 seconds) from the press apparatus 48. This means that the loops B are intermittently lowered from the upper limit position to the lower limit position. The control unit 100 controls the rotational speed of the servo motor 98 so that the support portions 90 are lowered at the same speed as the lowering speed of the loops B at the same timing as the start of a feeding out operation from the press apparatus 48 or at timing that is later than such start of operation. By doing so, it is possible to prevent a situation where the loops B are lowered slower than the lowering of the support portions 90 and the lower surfaces of the loops B become separated from the contact surfaces 92 of the support portions 90.

Note that an example where the up-down movement device 96 is realized by the ball screw 97 and the servo motor 98 has been described as the above embodiment. However, it is also possible to use another device, such as a fluid cylinder, as the up-down movement device.

Although the up-down movement of the loops B is produced by differences in timing between the drawing in by the cutoff apparatus 60 and the feeding out by the press apparatus 48, the drawing-in amount and feeding-out amount are not limited to those given in the embodiment described above.

Although the present invention has been described above by way of the preferred embodiments, the present invention is not limited to such embodiments and it should be obvious that various modifications may be implemented without departing from the scope of the invention.

What is claimed is:

1. A flattened tube fin manufacturing apparatus comprising:
    a press apparatus equipped with a mold apparatus that forms, in an unprocessed metal plate, cutaway portions, into which cutaway portion flattened tubes for heat exchanging are inserted, which cutaway portions are formed so as to extend from one side of the metal plate toward another side of the metal plate in a width direction of the metal plate, wherein the metal plate is moved in a transfer direction as the metal plate passes through the press apparatus, and wherein the width direction crosses the transfer direction at a right angle;

an inter-row slit apparatus which cuts the metal plate, in which the cutaway portions have been formed, into predetermined widths to form a plurality of metal strips that are arranged side-by-side in the width direction; and a cutoff apparatus that cuts each of the plurality of metal strips of the predetermined width formed by the inter-row slit apparatus into predetermined lengths, wherein the plurality of metal strips of the predetermined width outputted from the inter-row slit apparatus are provided so as to advance into the cutoff apparatus after entering a downwardly sagging state, the flattened tube fin manufacturing apparatus further comprises a support portion that contacts undersides in a vertical direction of the plurality of metal strips of the predetermined width in the downwardly sagging state to support the plurality of metal strips of the predetermined width, the support portion includes a plurality of contact surfaces that contact respective undersides of each of the plurality of metal strips of the predetermined width in the vertical direction, the respective contact surfaces are formed so as to be inclined so that a first side in the width direction of each respective contact surface is located above a horizontal plane and an opposite side of each respective contact surface that is spaced from the respective first side in the width direction of the respective metal strip is located below the horizontal plane, and a respective side wall is provided at one width-wise side of each of the respective contact surfaces.

2. A flattened tube fin manufacturing apparatus according to claim 1, wherein the support portion is capable of up-down movement in accordance with up-down movement of the plurality of metal strips of the predetermined width in the downwardly sagging state.

3. A flattened tube fin manufacturing apparatus according to claim 2, wherein the support portion is raised in synchronization with a drawing-in speed of the plurality of metal strips of the predetermined width by the cutoff apparatus, and the support portion is lowered in synchronization with a feeding speed of the plurality of metal strips of the predetermined width from the inter-row slit apparatus when drawing in of the plurality of metal strips of the predetermined width by the cutoff apparatus is stopped.

4. A flattened tube fin manufacturing apparatus according to claim 3, wherein the support portion is provided so that contact with the undersides in the vertical direction of the plurality of metal strips of the predetermined width is constantly maintained during raising by raising the support portion at a same time or earlier than timing at which the undersides in the vertical direction of the plurality of metal strips of the predetermined width in the downwardly sagging state are raised and during lowering by lowering the support portion at the same time or later than timing at which the undersides in the vertical direction of the plurality of metal strips of the predetermined width in the downwardly sagging state are lowered.

* * * * *